(12) United States Patent
Stark

(10) Patent No.: US 9,366,813 B1
(45) Date of Patent: Jun. 14, 2016

(54) REDUCING FIBER CROSSTALK IN MINERAL OPTICAL FIBER ARRAYS

(71) Applicant: Daniel Lee Stark, San Jose, CA (US)

(72) Inventor: Daniel Lee Stark, San Jose, CA (US)

(73) Assignee: Daniel Lee Stark, San Jose, CA (US)

( * ) Notice: Subject to any disclaimer, the term of this patent is extended or adjusted under 35 U.S.C. 154(b) by 0 days.

(21) Appl. No.: 14/710,064

(22) Filed: May 12, 2015

(51) Int. Cl.
*G02B 6/06* (2006.01)
*G02B 27/00* (2006.01)

(52) U.S. Cl.
CPC .............. *G02B 6/06* (2013.01); *G02B 27/0025* (2013.01)

(58) Field of Classification Search
CPC ........................................................ G02B 6/06
See application file for complete search history.

(56) References Cited

U.S. PATENT DOCUMENTS 3,797,910 A * 3/1974 Westwig .................. G02B 6/08
313/475

OTHER PUBLICATIONS

Subrata Ghose Subrata Ghose, titled "Ulexite, NaCaBO6(OH)6.5H2O: Structure Refinement, Polyanion Configuration, Hydrogen Bonding, and Fiber Optics" published in American Mineralogist, vol. 63, pp. 160-171, (1978).
A. Hartung, F. Wirth, and H. Bartelt in a paper titled "Light Propagation in Tapered Optical Fibers: Spatial Light Confinement and Generation of Plasmonic Waves" published in Progress In Electromagnetics Research Symposium Proceedings, Marrakesh, Morocco, p. 255 (Mar. 20-23, 2011).
Nobuyuki Takeyasu, Takuo Tanaka, and Satoshi Kawata, titled, "Metal Deposition Deep into Microsturcture by Electroless Plating" published in the Japanese Journal of Applied Physics, vol. 44, No. 35, pp. L 1134-L 1137, (2005).

* cited by examiner

*Primary Examiner* — Uyen Chau N Le
*Assistant Examiner* — Chad Smith

(57) ABSTRACT

This invention is an optical improvement to minerals that exhibit an image translation capability. These minerals translate an image between faces; however, the minerals exhibit considerable crosstalk between crystal fibers, which reduce image sharpness, contrast, and signal. This invention greatly reduces crystal fiber crosstalk.

4 Claims, 5 Drawing Sheets

REDUCING FIBER CROSSTALK IN MINERAL OPTICAL FIBER ARRAYS

CROSS REFERENCE TO RELATED APPLICATIONS none

STATEMENT REGARDING FEDERALLY SPONSORED RESEARCH AND DEVELOPMENT

All research and development associated with this invention has been performed using private funds. No federally sponsored research or development has been used.

BACKGROUND OF THE INVENTION

1. Field of Invention

This invention discloses an optical performance improvement for optical fiber array minerals such as halochtrite and ulexite. These minerals are examples of natural fiber arrays that form an array of parallel fibers capable of transferring light and an image from one surface to a second surface. However, because of high crosstalk between the fibers, the minerals are currently not practical for many applications, and remain a scientific curiosity. Fiber crosstalk reduces the image sharpness, contrast and signal. This invention enhances mineral fiber array performance by greatly reducing fiber crosstalk between fibers, providing a sharper image with higher contrast, improved thruput and in some cases wider bandwidth.

2. Description of Related Art

A artificial equivalent to the mineral fiber arrays is an artificially manufactured optic referred to as faceplates, which are used to translate an image between two surfaces. These faceplates have a high index of refraction difference between the center of the optical fiber and the cladding, allowing for a numerical aperture of one. The main application has been as a window over a detector array, allowing the focal surface to be at the outside of the window. The thin window does not introduce high image spatial distortion caused by non parallel fibers. Thicker artificial fiber arrays are subject to higher image distortion because of the non parallel fibers.

Usable fiber optic faceplates currently are artificially constructed by forming optical fibers in a parallel manner, fusing the assemblage, then drawing the melted assemblage to reduce fiber size. The index of refraction difference between the core and the cladding is high enough to yield a numerical aperture of one, which eliminates fiber crosstalk. A disadvantage is that the process does not maintain the fibers parallel, which introduces spatial distortion.

In summary, the main disadvantages of the artificially manufactured optics are cost and spatial distortion. The longer the component's length, the greater the image distortion, which limits the applications. An example of the artificially manufactured fiber optic component, referred to as a faceplate, is Schott fiber optic faceplate 47A. The faceplate terminology describes the use and short length. The short length minimizes spatial distortion.

Natural minerals, for example from the halochtrite family, also exhibit fiber optic array characteristics. The best know is ulexite. These mineral fiber arrays, such as ulexite, have a crystal that exhibits high micro fracturing, forming parallel fibers with a micro separation between the parallel micro fiber crystal segments. The parallel fiber segments acting together translate an image from one end of the crystal fiber array to the other end; however, in the case of ulexite, there is considerable fiber crosstalk resulting in contrast reduction, image smearing and significant signal loss. Ulexite is commonly called TV rock in recognition of this image translation phenomenon. Many minerals exhibit the image translation phenomenon, and can be synthetically grown. The naturally occurring minerals typically have impurities such as clay which detracts from performance. Synthetically grown natural minerals can avoid these impurities, and possibly add materials to enhance the desired properties.

A study of ulexite was reported in a paper by Subrata Ghose and an titled "Ulexite, $NaCaBO_6(OH)_6.5H_2O$: Structure Refinement, Polyanion Configuration, Hydrogen Bonding, and Fiber Optics" published in American Mineralogist, Volume 63, pages 160-171, (1978), which describes the nature of ulexite wherein the mineral forms spaces between adjacent parallel fiber crystals. The crystals are described as parallel crystals that act as fibers and are not packed solidly, having spaces on the order of 0.5 micrometers or less surrounding each fiber crystal. These spaces create an index of refraction drop at the edge of each fiber crystal causing partial light reflection off of the fiber crystal boundary and thus channel the light along the crystal fiber. The phenomenon supports an image translation between opposite faces perpendicular to the crystal fibers. Subrata Ghose also identifies that the spaces between the crystals support capillary action wherein a colored liquid enters the spaces between the crystals and travels along the space between the crystal fibers. Subrata Ghose reports no change in optical characteristics because of a liquid introduced into the spaces. Subrata Ghose did not identify the possibility of introducing materials that indeed would improve the fiber optic performance. A photograph of the crystals is provided in the paper, which shows the crystal structure pattern very similar to the cracked mud in a dry lake bottom. Subrata Ghose does not speculate how the fibers are formed.

Subrata Ghose states the possibility that the spaces between the crystals may be artificially arranged to eliminate the random cross sectional array and maximize the core to cladding index difference, but no method is advanced. Eliminating the cracking randomness would have the benefit of forming fiber shapes and sizes to better translate an image by matching the wavelength and detector array pixel geometry.

The fibers for ulexite are in close proximity, 0.2 to 0.5 microns separation as described by Subrata Ghose. The close proximity between fibers and low index of refraction difference between the fiber and the spaces cause considerable mode locking between adjacent fibers resulting in severe crosstalk. The index of refraction difference at the surface of the fibers varies from zero to 0.3 causing even higher fiber coupling at the low index of refraction locations. Fiber mode locking is a function of the near proximity between fibers as well as fiber shape. The natural difference in index of refraction between the fiber crystal and the fiber spaces are identified as a maximum of 0.3, which is insufficient to support a usable fiber optic array with close fiber packing.

No discussion in the literature is discovered, but my speculation is that the crystal fibers are formed as the ulexite mineral shrinks upon water loss, causing a complex cracking pattern, but maintaining geometrical shapes and forming random interlocking geometric crystal shapes. The process appears to be similar to the dry lakebed cracking pattern.

The optical characteristics of tapered gold coated optical fibers is reported by A. Hartung, F. Wirth, and H. Bartelt in a paper titled "Light Propagation in Tapered Optical Fibers: Spatial Light Confinement and Generation of Plasmonic Waves" published in Progress In Electromagnetics Research Symposium Proceedings, Marrakesh, Morocco, page 255 (Mar. 20-23, 2011). The paper reports that tapered gold coated fiber's light propagation in an optical waveguides as fundamentally different from free space propagation because light spreading by diffraction is avoided. The light is confined to modes which stay constant in shape along perfect waveguides and which can propagate with low attenuation for long propagation lengths. The metallic coated fibers support light propagation of a quarter of the wavelength, which is not true for typical fibers using a low index cladding. The geometrical fiber shape being very critical to performance.

The Hartung paper does not discuss mineral optical fiber arrays; however, this observation suggests that natural mineral fiber arrays with reflective interfaces may support longer wavelengths such as MWIR. The Hartung paper does not report on an advantage of gold coated fibers in an optical array wherein the fibers are in close proximity.

U.S. Pat. No. 5,061,035 A by Harvey N. Rogers, Jr. teaches use of metal coated fiber arrays including gold as a method to hermetically seal optical fiber arrays. The invention is comprised of a bundle of metal coated optical fibers which are sealed to each other and to a metal coated supporting structure. The application is for artificially manufactured fiber arrays and is not considered as a method to reduce crosstalk in a fiber array.

A paper by Nobuyuki Takeyasu, Takuo Tanaka and Satoshi Kawata, titled, "Metal Deposition Deep into Microsturcture by Electroless Plating" published in the Japanese Journal of Applied Physics, Vol. 44, No. 35, pp. L 1134-L 1137, (2005), describes electroless plating inside fine structures. The paper discusses gold deposition inside a capillary tube and a complex concave structure of micrometer scale consisting of polystyrene microbeads sandwiched between glass plates. The paper uses a complicated chemical process to deposit gold similar to silver plating on mirrors. A simpler method to deposit gold can be achieved using gold trichloride, with the gold precipitating when exposed to light as currently performed in photography.

U.S. Pat. No. 3,797,910 by Ralph A. Westwig, uses artificially made optical fibers laid parallel and fused as an imaging translation optic. Westwig teaches having every other optical square fiber constructed with a transparent cladding and an absorbent cladding. The absorbent cladding absorbs the vertically Polarized light, reducing crosstalk. Westwig's prior art teaches making a artificial optical fibers by forming a low index cladding around a high index core. The reflections at the interface of the core and cladding channel the light along the optical fiber. The cladding's second purpose is a method to separate the fiber cores and reduce fiber mode locking. Westwig does not use mineral fibers or utilize natural minerals such as ulexite that perform an imaging translation phenomenon. Therefore Westwig does not have the same fiber structure, and lacks the fractures between crystal fibers. Westwig cannot teach filling the fracture spaces between the fibers as a method to reduce crosstalk between fibers. Westwig does not teach use of optically active materials external to his fiber such as gold exterior to the cladding as a method to reduce mode locking.

Westwig, teaches a method to reduce fiber crosstalk by adding an absorbent cladding to every other optical fiber's cladding. Westwig, in accordance with the prior art uses a artificial formed optical fiber with a high index core and a low index cladding. However, the index of refraction difference between the core and cladding is not large enough to reflect the vertically polarized light allowing the vertically polarized light to enter the adjacent fiber in a cross coupling mode. Westig refers to the vertically polarized light as second light.

To overcome the dilemma, Westwig teaches a construction wherein a second fiber is constructed of a absorbent cladding rather than trasmissive cladding, thus absorbing the vertically polarized light. The absorbent cladding has the disadvantage of reducing the light throughput greater than fifty percent. Westwig did not consider reflective coatings outside of the cladding which is another method to reduce crosstalk, but has the further advantage of transmitting both horizontal and vertically polarized light.

Another disadvantage of the Westwig design is that all fibers are the same size, square, and in a uniform pattern in lines. This construction is the worst possible configuration because it causes severe Moiré patterns when used with a detector array with similar configuration. The fiber arrangement beats with the detector pixel array arrangement, creating severe Moiré Patterns. In order to avoid these Moiré patterns, Westwig must match each fiber with each pixel on the detector array, a very laborious, difficult task that in practice is expensive. Westig did not consider different geometric shaped fibers of different sizes, which is a method to avoid Moiré patterns.

The methods required to fabricate Westwig's design is labor intensive because of the many steps and accuracy required to lay each fiber independently. The required accuracy to maintain the fibers parallel through the fabrication process is typically not achieved. Current optics fabricated similar to the prior art used by Westwig does not achieve parallel fibers over any distance, limiting their use to thin sections rather than longer image translation devices. Westwig could not consider natural minerals such as ulexite that provide an assembled optic with parallel crystal fibers because the ulexite is of a totally different structure, and violates Westwig's classical construction of optical fibers with high index core and low index cladding. The crystal like parallel needles act as fibers but do not have a cladding. The small spaces between the mineral crystal fibers act similar to cladding; however, exhibit high cross coupling because of near positioning and low index difference between the edge of the crystal fiber and fractured open space between crystal fibers.

Crystalline minerals also exhibit birefringence causing the desirable parallel polarized light to be converted to vertically polarized light which increases the cross coupling to the adjacent fiber. Thus Westwig's basic principle of absorbing the vertically Polarized light in the second fibers cladding is not supported by any birefringent core, restricting the core to only man made amorphous materials.

SUMMARY OF THE INVENTION

What is described is a method to reduce the crosstalk between adjacent crystal fibers in minerals that act as image translation optical fiber array. The method is to introduce any combination of low index, negative index, radiation absorbent, or reflective materials into the spaces surrounding the crystal fibers.

This invention's primary object is to provide a method to reduce and/or eliminate the crosstalk between adjacent mineral crystal fibers whose assemblage acts as a fiber optic image translation optic.

A second objective is to provide an alternate to expensive artificial fiber optic image translation optics such as faceplates, and provide a high resolution inexpensive fiber optic device.

A third objective is to provide a high resolution fiber optic device that preserves image spatial coherency over the entire length allowing use of optical designs using ball lenses and flat detector arrays.

DETAILED DESCRIPTION OF THE INVENTION

Figure 1:
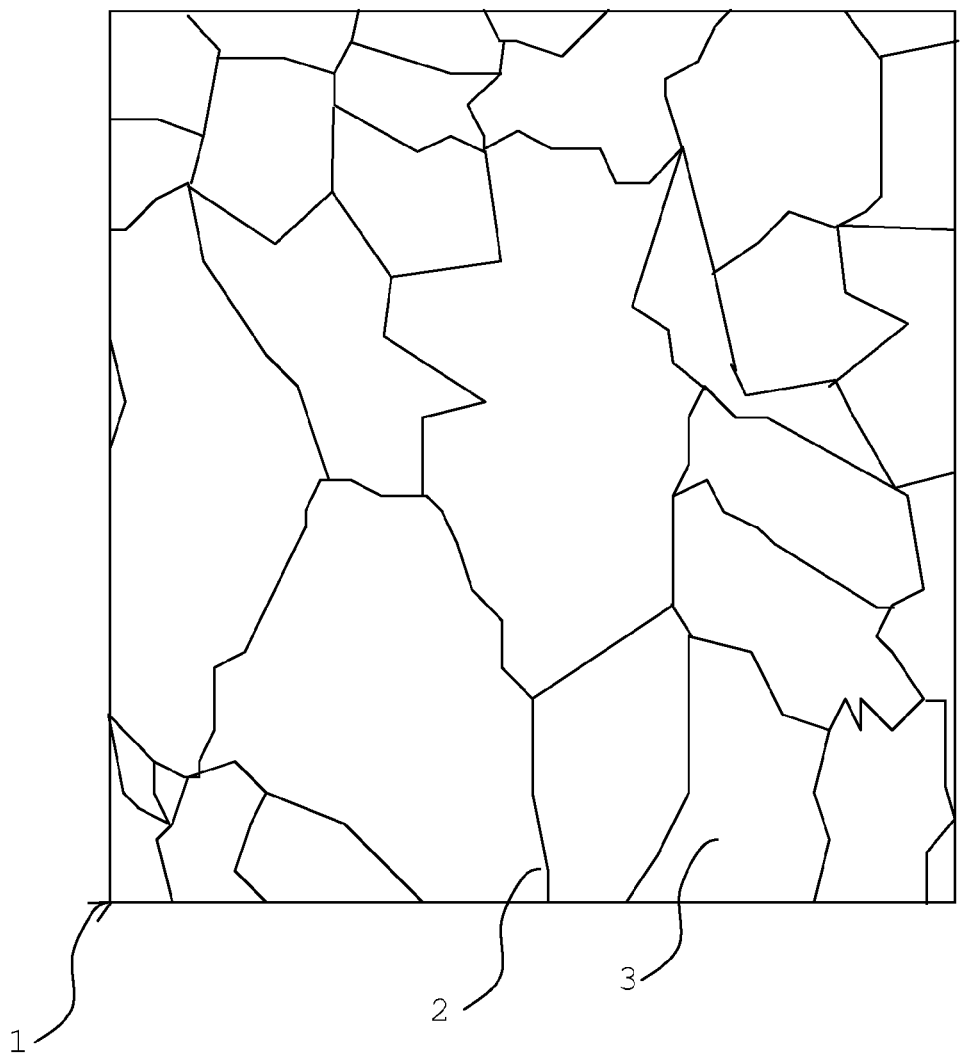
FIG. 1 is a highly magnified top view illustration of a mineral crystal structure.

FIG. 1 Detailed Description

FIG. 1 is a highly magnified top view of the natural mineral optical fiber array crystal assembly, 1, as it exists in nature. The spaces, 2, between the fibers are sub micron. These spaces, 2, form a boundary around each fiber crystal, 3. The fibers, 3, cross sections are on the order of several microns. The fiber crystal shapes are highly variable made up of multi faceted somewhat random interlocking geometries. The pattern is very similar to the cracked mud pattern on a dry lake bed, or magma columnar jointing as described in geology. These spaces, 2, between the individual crystals act as the fiber cladding, creating the effect of an optical fiber array by causing the light entering one end of the crystal fiber to be partially reflected off of the fiber crystal boundary, and channeled down the fiber. The limiting factors for performance are caused by mode locking between closely spaced adjacent crystal fibers, 3, causing considerable crosstalk between crystal fibers. In the case of ulexite, the birefringent crystal separates the polarizations allowing one polarization to be partially reflected off of the fiber boundary while the other polarization penetrates the boundary and partially enters into the adjacent crystal fiber. The effect causes additional fiber crystal cross talk, which blurs the image, decreases contrast and signal. In the case of ulexite, the difference between index of refractions of the space and the crystal fiber at best allows a numerical aperture of 0.3.

Figure 2:
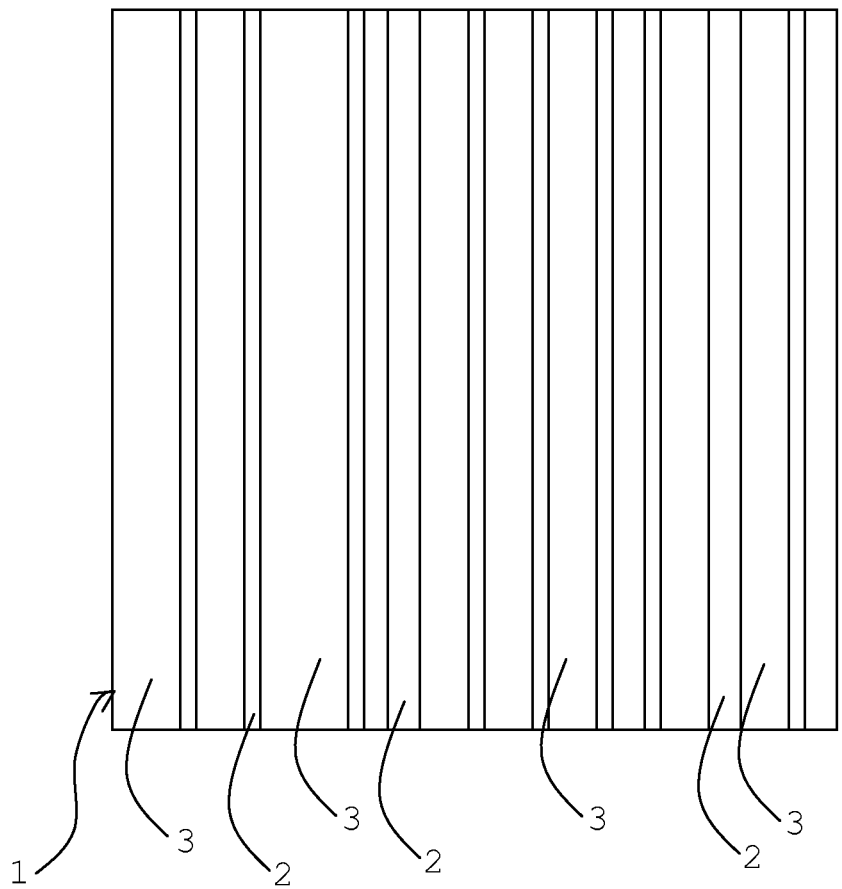
FIG. 2 is a highly magnified concept drawing side view illustration of mineral crystal structure.

FIG. 2 Detailed Description

FIG. 2 is a concept drawing of a highly magnified cross sectional side view of several fibers in a natural mineral optical fiber array assembly, 1, as it exists in nature. The size for the spaces, 2, and the fibers, 3, are exaggerated in size in order to illustrate the concept of parallel fibers forming an optical fiber array. The closely spaced vertical lines describe the spaces, 2, which form boundaries surrounding each crystal fiber, 3. The spaces, 2, between the crystal fibers, 3, are variable in size as shown in FIG. 2. The spaces, 2, are on the order of sub micron in size and the crystal fibers, 3, several microns.

Figure 3:
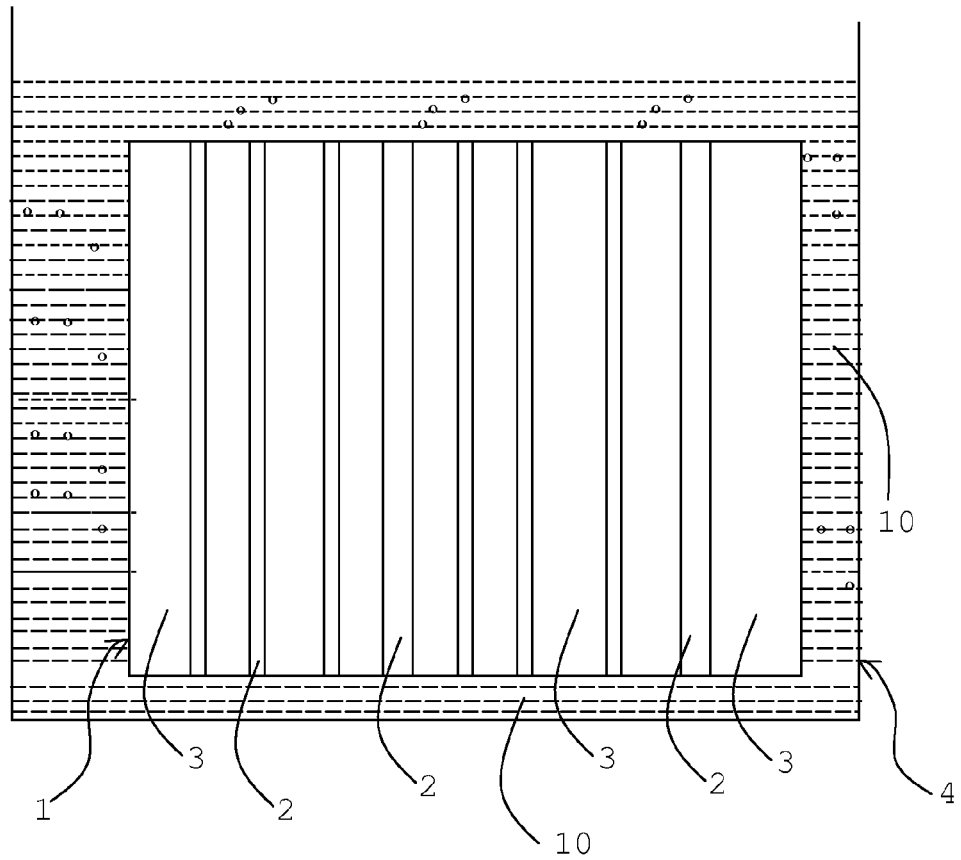
FIG. 3 is a highly magnified concept drawing side view of a crystal specimen in a container filled with liquid.

FIG. 3 Detailed Description

FIG. 3 is a concept drawing showing a cross sectional side view of a container, 4, containing a mineral optical fiber array, 1, immersed in a liquid, 10. The sizes of the optical fibers, 3, and the spaces, 2, forming boundaries around the optical fibers are highly exaggerated in size in order to illustrate the concept of the optical fiber defined by spaces around each fiber. The optical fiber, 3, properties can be modified by introducing materials into these spaces, 2, which surround each optical fiber, 3. The liquid, 10, acts as a vehicle having in suspension or in solution a material to be deposited in the spaces, 2. Various methods to introduce the desired material into spaces, 2, can be any combination of capillary action, submersion, or ultrasonic bath methods. These materials may be any combination of low/negative index of refraction, absorbent, or reflective to the wavelengths of interest.

Best test results were achieved with gold trichloride dissolved in alcohol. The dissolved gold chemicals are typically just referred to as gold chloride, with several gold chloride chemicals being available. Gold trichloride is the preferred embodiment because the gold precipitates when exposed to light.

The liquid, 10, is not shown over the mineral face of the fibrous mineral, 1, for clarity.

Figure 4:
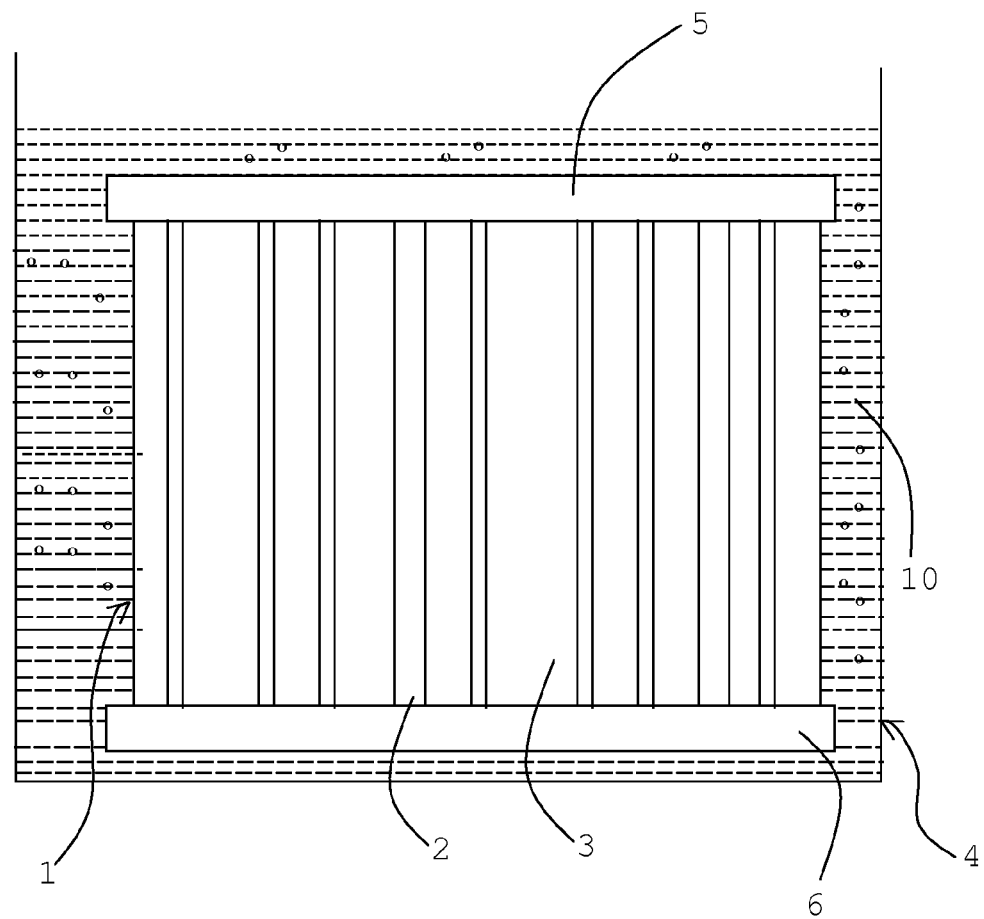
FIG. 4 is a highly magnified concept drawing side view of a crystal specimen in a container with an anode and a cathode in position.

FIG. 4 Detailed Description

FIG. 4 is a concept drawing showing a cross section side view of a mineral fiber array, 1, in a container, 4, with the addition of a cathode, 5, and an anode, 6. Electrophoresis may also be used as shown in FIG. 4. The anode or cathode may be positioned at either end of the crystal fiber mineral, depending on desired material direction of flow. The cathode or anode at the top of the fiber array crystal, 1, may be positioned above the liquid, 10, not as shown. Electrophoresis causes motion of dispersed particles relative to a fluid under the influence of an electric field. Electrophoresis was experimentally used to introduce free silver into the spaces, 2. The mineral crystal fibers, 3, and spaces, 2, between the fibers are shown highly magnified in order to describe the concept.

The liquid, 10, carries materials into the spaces, 2, with the materials acting as a coating to the crystal fibers, 3. These materials are selected to optically modify the fiber space boundary and improve the optical characteristics. These materials may be any combination of low/negative index of refraction, absorbent, or reflective to the wavelengths of interest. It is not required that the materials coat the crystals, but mix with the potential material in the spaces. It is theorized that the spaces, 2, are not empty but contain particles of the mineral and/or impurities that potentially in part cause the variation of index of refraction differences between the spaces and the fiber. The hydroxide part of the mineral fibers exhibits a low index of refraction similar to water, which would reduce the fiber to space index of refraction difference if at the boundary between the fiber and the spaces.

Experimental results with different materials showed best performance using gold and silver, with the gold acting more as a reflector and the silver acting more as an absorber. Experiments were performed with soluble gold chemicals which introduced gold into the spaces by simply immersing the crystal in the chemical bath. The crystal, 1, was simply immersed in gold trichloride, allowing the fluid to carry the dissolved gold between the crystal fibers, 3. The gold trichloride is deposited into free gold by introducing the gold trichloride filled crystal, 1, to light, and allowing the crystal to dry out. The method used was to direct the light down the crystal fibers with the intent of causing gold deposition on the most radiation leaky crystal fiber sections; however, this particular step may not be necessary. Very little gold was shown to have a dramatic positive effect in reducing radiation loss as well as improve contrast and image sharpness. Gold trichloride is soluble in many solvents, such as alcohols, esters, ethers, and ketones, allowing avoidance of water, which damages some of the mineral crystals.

Other processes using different materials may indeed exist; however, the gold chloride chemicals are readily available, and do not coat the container, providing an efficiency in use.

The gold may not only coat the crystal fiber, but may mix with potential materials in the spaces, forming a reflective body acting like a gold coated fiber. Gold is the preferred embodiment, with gold trichloride as the preferred chemical to introduce gold between the crystal fiber spaces. Other gold chloride chemicals are available, as well as other soluble gold compounds, and even nanopowder gold.

The liquid, 10, is not shown over the mineral face of the fibrous mineral, 1, for clarity. The fiber crystal, 3, sizes and the spaces, 2, are shown of highly exaggerated size in order to clearly describe the process.

Figure 5:
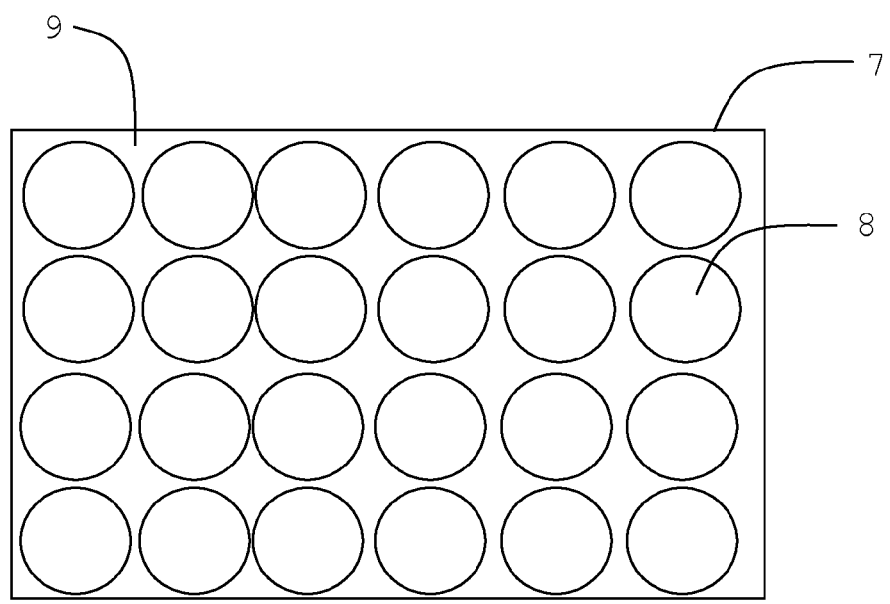
FIG. 5 is a top view of tooling controlling fiber size and geometry for synthetically grown mineral fiber arrays.

FIG. 5 Detailed Description

FIG. 5 is a tooling concept to control the cracking in synthetically grown fibrous minerals, examples being Satin Spar gypsum and ulexite, thus controlling fiber size and shape. FIG. 5 shows a series of holes, 8, formed in a plate, 7. A synthetically grown mineral crystal, not shown, is grown on the plate, 7, with the fibers formed vertical to the plate, 7. When the mineral shrinks, the plate will not shrink and remain rigid, causing stress to the crystal in the webbing areas, 9. It is theorized that the loss of hydrous water from minerals such as halotrichite, satin spar gypsum and ulexite cause the shrinking and subsequent cracking which forms the parallel crystal fibers. Thus the plate, 7, with the webbing, 9, will induce stress into the mineral inducing cracking in the desired geometry.

The current state of the art capability to machine very small features in materials is demonstrated using precision laser machining. Laser ablation can form holes 300 nanometers in diameter, which can make a tooling having an array of holes with webbing between the holes. It is proposed that the webbing will be capable of inducing sufficient stress to cause the mineral to crack in a predetermined pattern. The tooling hole pattern may be of any shape, with the protruding webbing being the mechanism to induce cracking.

What is claimed is:

1. A modification to a light transmission or imaging translation crystal assembly as found in nature composed of a natural mineral or artificially grown mineral whose fiber like needle crystals naturally formed adhered to each other form a crystal assembly, whose fiber like needle crystals act to channel light down a fiber like needle crystal, whose plurality of fiber like crystals naturally occur parallel, forming a naturally occurring crystal assembly wherein an input side of said crystal assembly receives light and or an image and translates the light and or image to an opposite face of the light translation crystal assembly, the light translation crystal assembly comprising:

a naturally occurring or artificially grown fibrous mineral crystal assembly with the characteristics of a plurality of parallel fiber like needle crystals adhered to each other in a crystal assembly and formed parallel with porous fractured sub micron distances between exterior boundaries of adjacent fiber needle crystals with said areas between fiber needle crystals supporting capillary action, however maintaining natural adherence between adjacent fiber needle crystals with said distances between fiber like needle crystals partially filled containing porous combinations of clay, air and the mineral, a modification to the naturally occurring or artificially grown crystal assembly with fiber like needle crystals formed in parallel having sub micron distances between outside edges of adjacent fiber like needle crystals having the naturally occurring mineral structure modified with addition of gold or materials not naturally occurring in said sub micron distances between external boundaries of said fiber like needle crystals with said materials acting to provide a transformation to the natural characteristics by reducing or eliminating crosstalk between said needle crystal fibers by reflecting both polarizations and forming a unique structure not found in nature.

2. The said image translation device of claim 1 being structurally modified to have improved image translation properties as not found in nature by reducing fiber crosstalk with addition in the sub micron distances between the adjacent exterior boundaries of needle crystal fibers of claim 1 any single material or any combination of low index, negative index, absorbent or reflective materials in said sub micron distances between the adjacent exterior boundaries of needle crystal fibers sub micron distances with said materials causing reduced cross talk between said needle crystal fibers by reflecting both light polarizations.

3. The said sub micron distances between the outside edges of said fiber like needle crystals of claim 1 having said structure modified by gold being introduced into the sub micron distances via capillary action resulting in an effective unnatural crystal assembly which reduces and eliminates cross talk between fiber like needle crystals by reflecting both polarizations of light at the outside boundaries of said fiber like needle crystals, creating a structure not found in nature.

4. The preferred embodiment having a gold chemical in solution as a modification to the crystal assembly structure of claim 1 being introduced between the fiber like needle crystals of claim 1, by immersion of the crystal assembly in the soluble gold chemical solution allowing the solution to fill the areas between said fiber like needle crystals via capillary action, and depositing the gold between fiber like needle crystals using light as the precipitating agent.

* * * * *